US011086737B2

(12) United States Patent
Peltz et al.

(10) Patent No.: US 11,086,737 B2
(45) Date of Patent: Aug. 10, 2021

(54) NON-VOLATILE STORAGE SYSTEM WITH RAPID RECOVERY FROM UNGRACEFUL SHUTDOWN

(71) Applicant: WESTERN DIGITAL TECHNOLOGIES, INC., San Jose, CA (US)

(72) Inventors: Uri Peltz, Hod-Hasharon (IL); Einat Lev, Rehovot (IL); Judah Gamliel Hahn, Ofra (IL); Daphna Einav, Salit (IL); Karin Inbar, Ramat Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 75 days.

(21) Appl. No.: 16/249,479

(22) Filed: Jan. 16, 2019

(65) Prior Publication Data

US 2020/0226038 A1    Jul. 16, 2020

(51) Int. Cl.
*G06F 11/14* (2006.01)
*G06F 3/06* (2006.01)

(52) U.S. Cl.
CPC ........ *G06F 11/1474* (2013.01); *G06F 3/0619* (2013.01); *G06F 3/0659* (2013.01); *G06F 3/0679* (2013.01); *G06F 2201/82* (2013.01)

(58) Field of Classification Search
CPC ............................ G06F 11/14; G06F 11/1474
USPC .......................................................... 714/16
See application file for complete search history.

(56) References Cited

U.S. PATENT DOCUMENTS

| | | | | |
|---|---|---|---|---|
| 8,392,479 B1* | 3/2013 | Pantin | .................... | G06F 16/11 707/823 |
| 9,170,938 B1* | 10/2015 | Walsh | .................. | G06F 3/0688 |
| 9,817,593 B1* | 11/2017 | Inbar | ..................... | G11C 14/00 |
| 10,007,433 B2 | 6/2018 | Hahn | | |
| 2009/0172466 A1* | 7/2009 | Royer | ................ | G06F 11/1064 714/6.12 |
| 2009/0249001 A1* | 10/2009 | Narayanan | ............ | G06F 3/0625 711/161 |
| 2012/0011303 A1* | 1/2012 | Iwasaki | ................. | G06F 3/0632 711/103 |
| 2014/0143476 A1* | 5/2014 | Sela | ....................... | G06F 3/0619 711/103 |
| 2015/0106556 A1* | 4/2015 | Yu | ....................... | G06F 13/1694 711/103 |
| 2015/0160879 A1* | 6/2015 | Flynn | ..................... | G06F 3/065 711/103 |
| 2016/0118130 A1* | 4/2016 | Chadha | ................ | G11C 16/225 711/103 |
| 2017/0109096 A1 | 4/2017 | Jean et al. | | |
| 2018/0011714 A1* | 1/2018 | Han | ...................... | G06F 3/0604 |
| 2019/0114093 A1* | 4/2019 | Roeder | ................ | G06F 3/0619 |

(Continued)

FOREIGN PATENT DOCUMENTS

KR    20090129625 A    12/2009

*Primary Examiner* — Kamini B Patel
(74) *Attorney, Agent, or Firm* — Vierra Magen Marcus LLP

(57) ABSTRACT

An apparatus includes a plurality of non-volatile memory cells and control circuitry connected to the plurality of non-volatile memory cells. The control circuitry is configured to receive write commands from a host and identify write commands associated with temporary data. In a recovery operation, control data associated with the temporary data is omitted from rebuilt control data.

20 Claims, 14 Drawing Sheets

(56) References Cited

U.S. PATENT DOCUMENTS

2020/0097188 A1\* 3/2020 Gunda ................... G06F 3/068
2020/0150873 A1\* 5/2020 Saxena ................ G06F 3/0679

\* cited by examiner

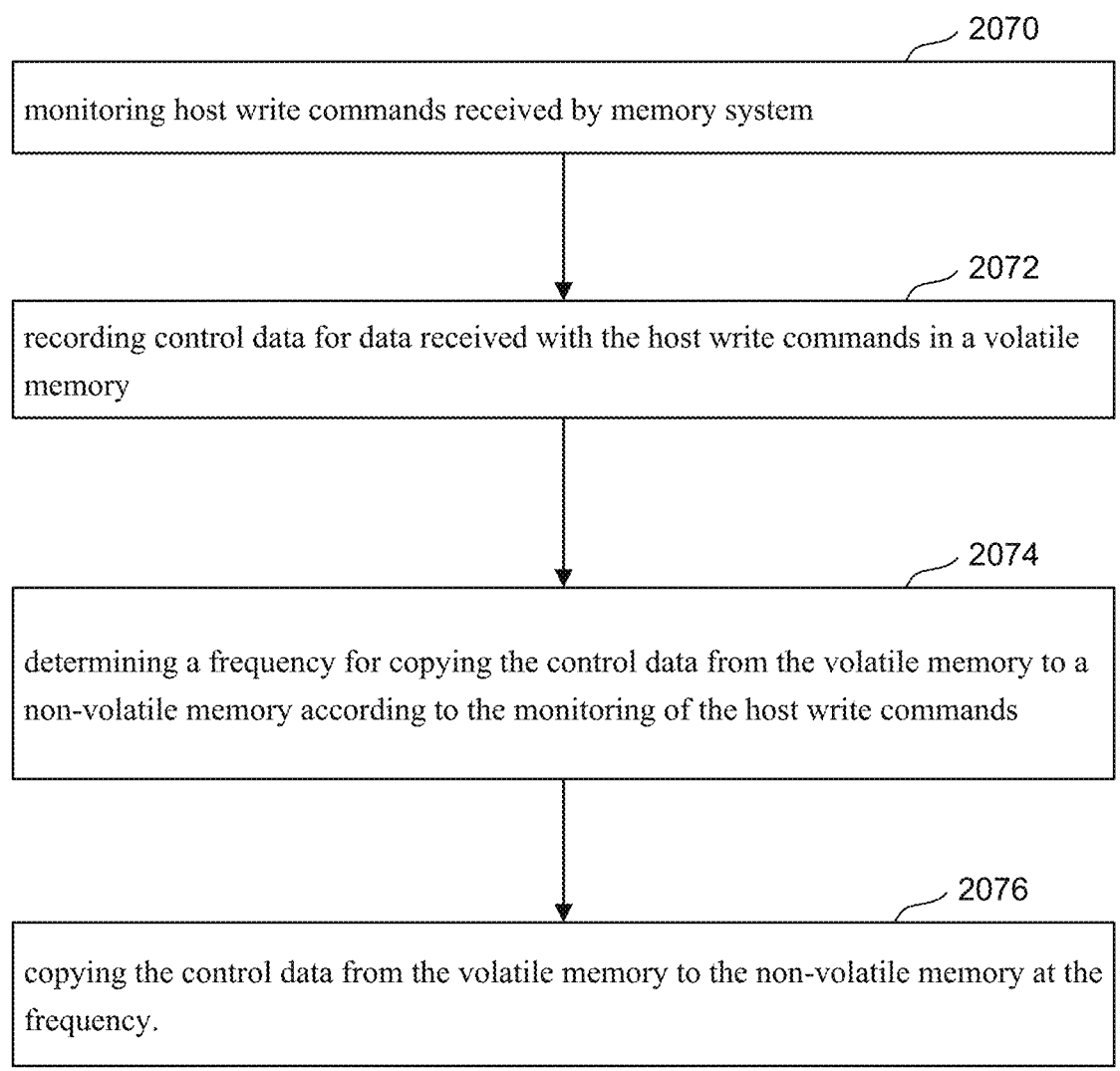

NON-VOLATILE STORAGE SYSTEM WITH RAPID RECOVERY FROM UNGRACEFUL SHUTDOWN

BACKGROUND

Many electronic devices make use of memory systems. Often, the memory system includes non-volatile memory such as flash memory. An electronic device that includes a memory system, or is connected to a memory system, is often referred to as a host.

A memory system that includes semiconductor memory may be in communication with a host through an interface. In some cases, more than one data storage device may be in communication with a host system through one or more interfaces.

A memory system that includes semiconductor memory may include one or more non-volatile memory dies that are in communication with a controller. For example, a memory bus may connect non-volatile memory dies with a controller in a memory system.

BRIEF DESCRIPTION OF THE DRAWINGS

Like-numbered elements refer to common components in the different figures.

FIG. 16 illustrates an example of a method of operating a memory system.

DETAILED DESCRIPTION

Figure 1:
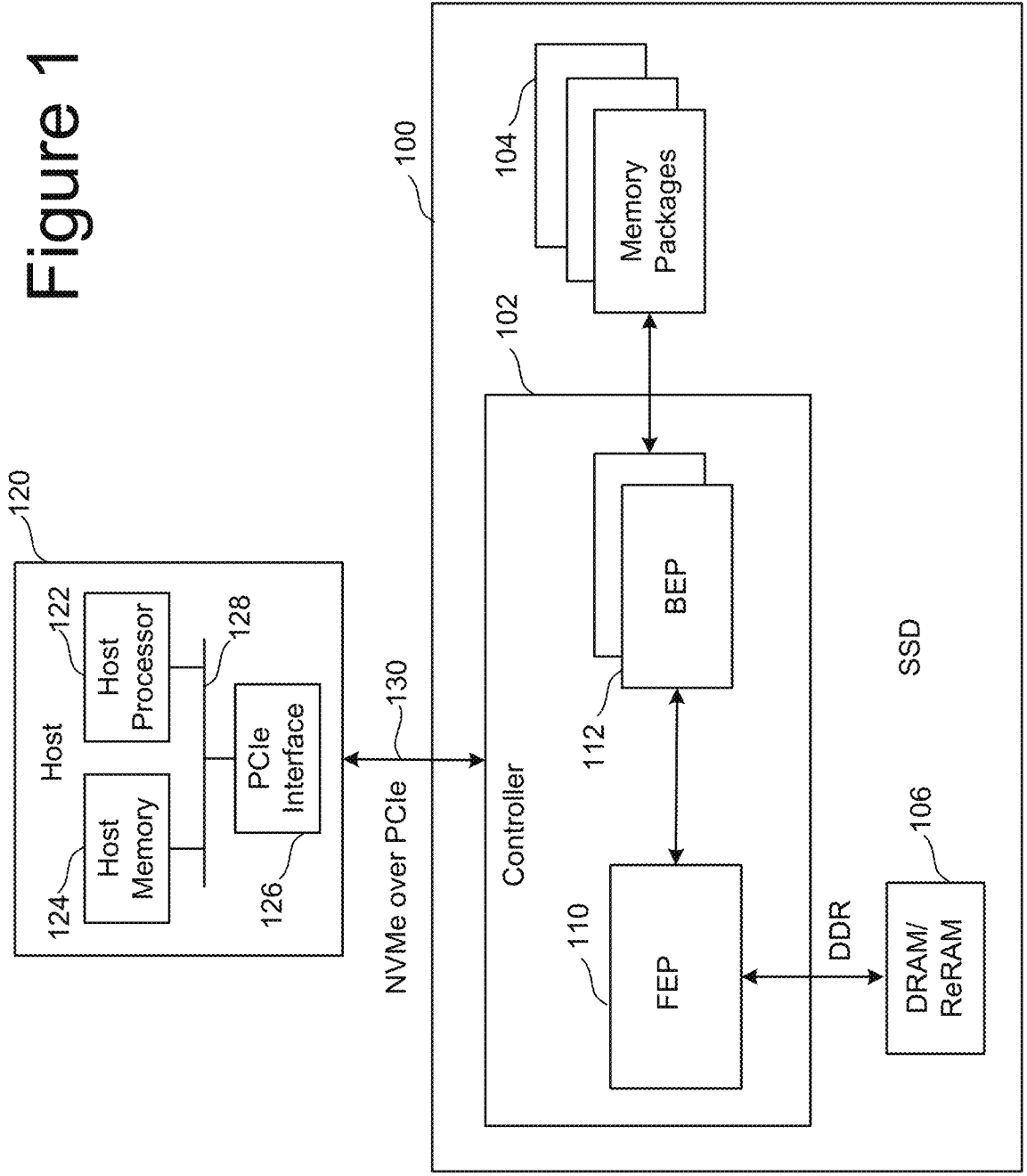
FIG. 1 is a block diagram of one embodiment of a memory system connected to a host.

In some non-volatile storage systems, control data may be stored in volatile memory and may be copied to non-volatile memory at intervals. A power loss may cause an ungraceful shutdown (UGSD), which may result in loss of any control data in volatile memory that has not been copied to non-volatile memory. During a recovery operation from an ungraceful shutdown, control data may be rebuilt (e.g. by performing a scan of open blocks to identify stored data that is not reflected in control data found in non-volatile memory). Such rebuilding may take significant time and, in some cases, may exceed a time limit. A memory system may be unable to execute read commands from a host prior to rebuilding control data, which may impact host recovery time. How to rapidly recover from such a UGSD presents a technical problem that may be addressed by aspects of the present technology.

According to some examples presented here, the amount of uncopied control data (control data in volatile memory that is not copied to non-volatile memory) may be managed to ensure that the time to rebuild control data is not excessive. Host write commands may be monitored (e.g. to identify how much sequential data and how much non-sequential data is written). The frequency for copying the control data from volatile memory to non-volatile memory may be determined according to the monitoring of these host write commands. For example, rebuilding control data associated with a given amount (e.g. 100 MB) of sequential data is quicker than rebuilding control data for the same amount of non-sequential data. Based on the host write workload (how much sequential and non-sequential data is received), frequency of copying control data may be adjusted to ensure that the estimated time to rebuild control data stays at an appropriate level (e.g. below a predetermined time limit). The control data copy frequency may be adjusted as appropriate as host write workload changes (e.g. frequency determined by estimated time to rebuild control data so that the maximum estimated time to rebuild is less than a time limit). Adjustment of control data copy frequency according to host write workload may provide a technical solution to the problem of timely UGSD recovery. Such a solution may improve operation of memory systems by enabling rapid rebuilding of control data in a memory system, which enables rapid execution of host read commands after UGSD.

According to some examples presented here, when receiving host write commands, a non-volatile storage system may identify temporary data that will not be needed by a host during recovery in response to an ungraceful shutdown (e.g. page or swap file data, cache files used by browsers, and/or application-created temporary files). For example, a host may identify certain write data as temporary when it sends a corresponding write command. The non-volatile storage system may store temporary data in a dedicated area (e.g. dedicated block or blocks). During a recovery operation from an ungraceful shutdown, the non-volatile storage system may omit control data associated with temporary data when rebuilding control data, e.g. by omitting any dedicated area associated with temporary data when scanning open blocks. Thus, control data associated with temporary data is not rebuilt. Reducing the amount of control data to rebuild may make rebuilding faster and thus allow a faster recovery operation and may provide a technical solution to the problem of timely UGSD recovery. Such a solution may improve operation of memory systems by enabling rapid rebuilding of control data in a memory system, which enables rapid execution of host read commands after UGSD. Separate treatment of temporary data may be combined with adjusting control data copy frequency according to write workload (e.g. control data associated with temporary data may be omitted when estimating time to rebuild control data).

FIG. 1 is a block diagram of one embodiment of a memory system 100 connected to a host 120. Memory system 100 can implement the technology proposed herein. Many different types of memory systems can be used with the technology proposed herein. One example memory system is a solid state drive ("SSD"). Memory system comprises a Controller 102, non-volatile memory 104 for storing data, and local memory (e.g. DRAM/ReRAM) 106. Controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the interfaces to the memory packages (e.g. Toggle Mode interfaces), etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 104 utilize NAND flash memory (including two-dimensional NAND flash memory and/or three-dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126. Host memory 124 is the host's physical memory, and can be DRAM, SRAM, non-volatile memory or another type of storage. Host 120 is external to and separate from memory system 100 (e.g., an SSD). In one embodiment, memory system 100 is embedded in host 120.

Figure 2:
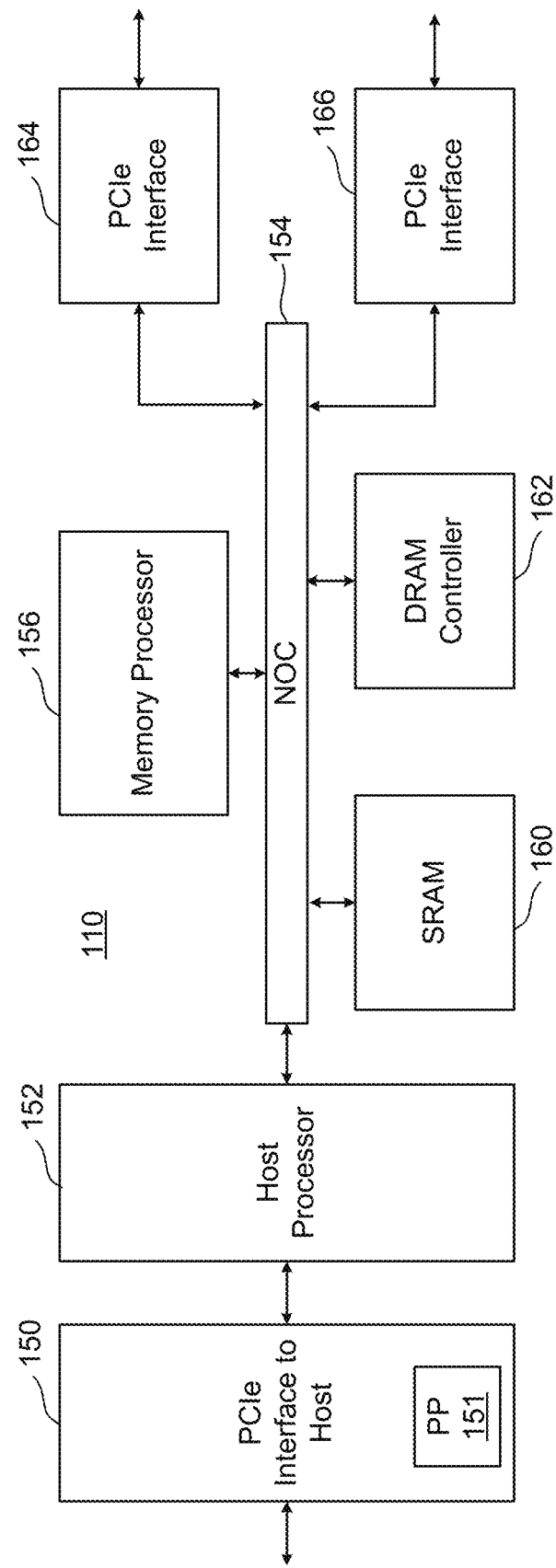
FIG. 2 is a block diagram of one embodiment of a Front End Processor Circuit. The Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 3:
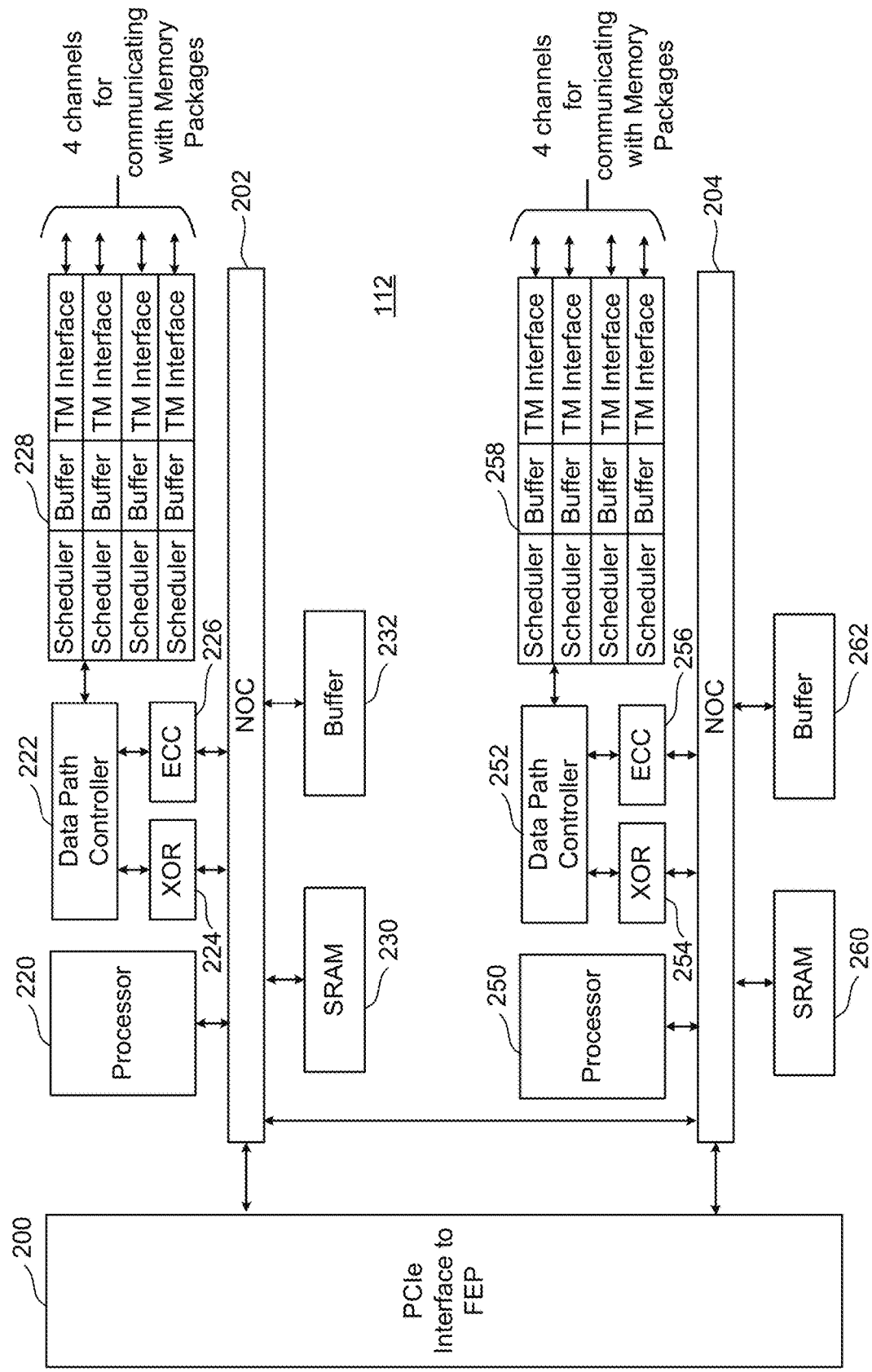
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
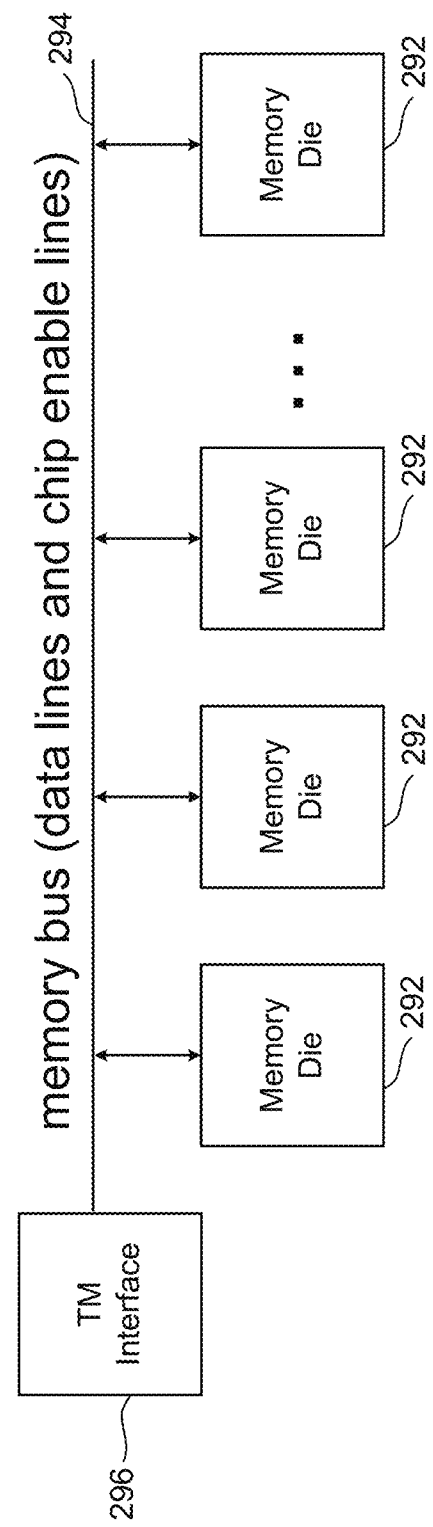
FIG. 4 is a block diagram of one embodiment of a memory package.

FIG. 4 is a block diagram of one embodiment of a memory package of non-volatile memory 104 that includes a plurality of memory die 292 connected to a memory bus 294 (data lines and chip enable lines). The memory bus 294 connects to a Toggle Mode Interface 296 for communicating with the TM Interface of a BEP circuit 112 (see e.g. FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
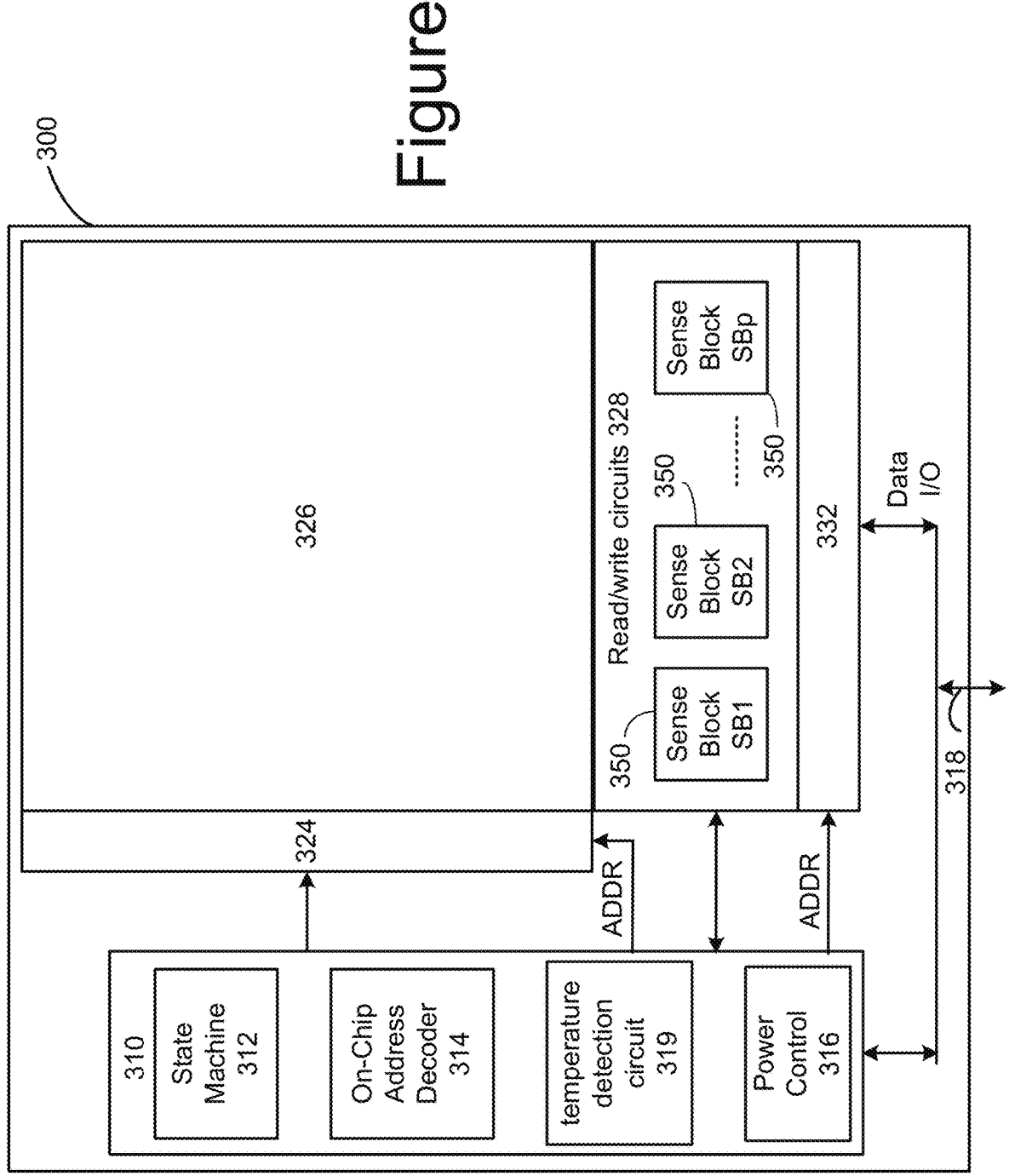
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the Controller and the memory die 300 via lines 318. In one embodiment, memory die 108 includes a set of input and/or output (I/O) pins that connect to lines 118.

Control circuitry 310 cooperates with the read/write circuits 328 to perform memory operations (e.g., write, read, and others) on memory structure 326, and includes a state machine 312, an on-chip address decoder 314, a power control module 316 (power control circuit) and a temperature detection circuit 319. State machine 312 provides die-level control of memory operations. In one embodiment, state machine 312 is programmable by software. In other embodiments, state machine 312 does not use software and is completely implemented in hardware (e.g., electrical circuits). In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

In some cases, a memory system may lose power unexpectedly so that the memory system does not shut down in an orderly manner. This can have consequences when the memory system is powered on again (e.g. when power is restored). When power loss is expected, a memory system may go through a routine to prepare and shut down in an orderly manner (graceful shutdown, or GSD). For example, certain data that may be stored in volatile memory may be copied to non-volatile memory in preparation for power loss. In contrast, during ungraceful shutdown (UGSD), no such preparation is performed and data stored in volatile memory may be lost. This data may include control data that can be rebuilt. However, rebuilding such control data may be time consuming. Reducing the time needed to perform such rebuilding in response to an ungraceful shutdown may provide certain advantages, for example, ensuring that the overall time for a recovery operation from an unexpected power loss is less than a predetermined amount of time.

Figure 6:
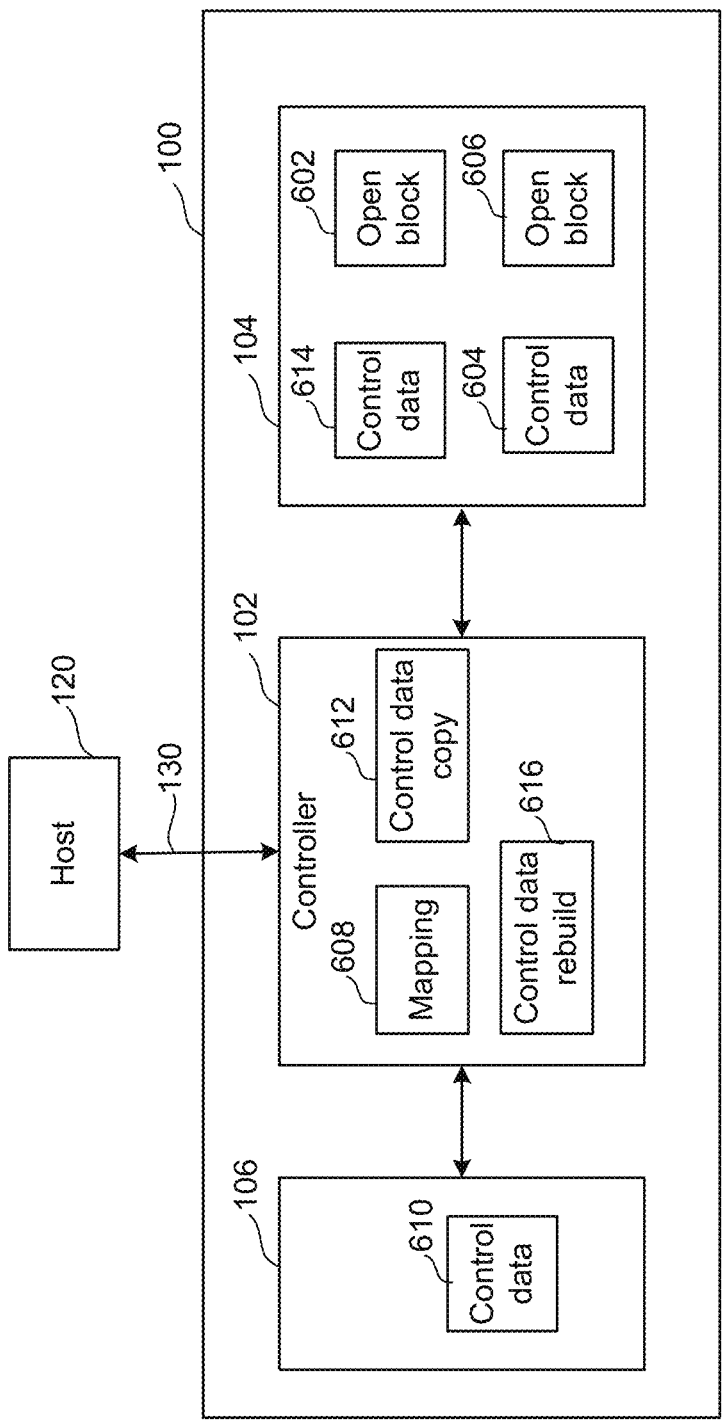
FIG. 6 illustrates an example of components of a memory system associated with control data.

FIG. 6 illustrates an example of some components of memory system 100, which is connected to host 120 by interface 130 to receive write commands from host 120 as previously illustrated in FIG. 1. Write data received with write commands from host 120 are written to open blocks 602, 604, 606 in non-volatile memory 104 (while three open blocks are shown in this illustration, it will be understood that the number of open blocks may be more or less than three). In general, such write data that is received with host write commands may be received from a host with corresponding logical addresses (e.g. logical block addresses, or LBAs) which are mapped by mapping circuit 608 of controller 102 to physical addresses in non-volatile memory 104 (e.g. to locations in open blocks 602, 604, 606). Mapping circuit 608 may store data in different locations according to characteristics of the data (e.g. sequential, non-sequential). Mapping circuit 608 generates control data 610 (logical-to-physical mapping data, in this example) that may be stored in volatile memory such as local memory 106. Control data 610 may be copied by control data copy circuit 612 to non-volatile memory 104. This provides a copy of control data 614 in non-volatile memory 104 so that it is available after power loss (such a copy in non-volatile memory may be referred to as a "journal"). For example, control data 610 may be copied at some frequency based on the amount of new data written in non-volatile memory 104 or may be copied in preparation for a power loss or some other event. When control data 610 is copied as part of a shut-down routine in preparation for a power loss, control data 614 then contains all current control data at the time of power loss so that control data 610 in local memory 106 can be restored by copying from control data 614 in non-volatile memory 104. In some memory systems, a battery or capacitor provides sufficient power to complete a shut-down routine when external power is lost. In other memory systems, power may be lost without warning so that no shut-down routine is performed. When power is lost without adequate preparation, there may be differences between control data 610 in local memory 106 and control data 614 in non-volatile memory 104. For example, control data associated with data written since the last control data copy operation may be recorded in control data 610 in local memory 106 but may not be recorded in control data 614 in non-volatile memory 614. Control data rebuild circuit 616 is provided to rebuild control data 610 in such cases (i.e. to rebuild any lost control data that may have been in local memory 106, but not in non-volatile memory 104, prior to power loss). Control data rebuild circuit 616 may check the last recorded entries in control data 614 to see where the last recorded writes occurred in open blocks 602, 604, 606. Control data rebuild circuit 616 may then scan beyond the last recorded writes in open blocks 602, 604, 606 to see if there was any data written after these writes. If there were additional writes, metadata written with such data (e.g. LBA and/or other identifying information) is read and used to rebuild control data 610 (e.g. to build a logical-to-physical map based on physical locations where data is found and LBAs associated with the data).

Figure 7:
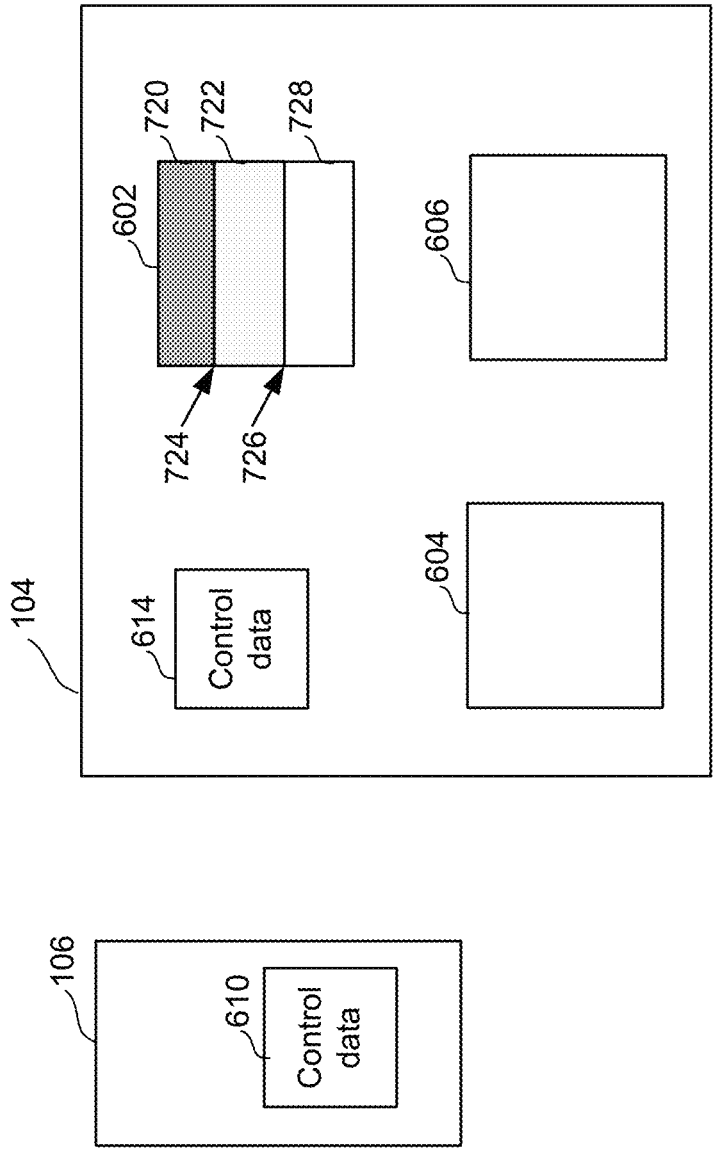
FIG. 7 illustrates an example of data stored in an open block in a non-volatile memory.

FIG. 7 illustrates an example of control data 610 in local memory 106 and control data 614 in non-volatile memory 104 at some time between control data copy operations (i.e. at a time when data has been written in non-volatile memory 104 and the corresponding control data in local memory 106 has not been copied to non-volatile memory 104). Open block 602 contains a first written portion 720 that contains data written prior to the last control data copy operation. Because this data was written prior to the last control data copy operation, control data corresponding to first written portion 720 was copied to non-volatile memory 104 in the last control data copy operation. Thus, control data 614 in non-volatile memory 104 includes logical-to-physical mapping data for first written portion 720 (and for corresponding portions of open blocks 604, 606, that were written prior to the last control data copy operation). Second written portion 722 contains data written after the last control data copy operation. Because this data was written after the last control data copy operation, control data corresponding to second written portion 722 has not been copied to non-volatile memory 104. Thus, control data 614 in non-volatile memory 104 does not include logical-to-physical mapping for second written portion 722 (or for corresponding portions of open blocks 604, 606). While control data corresponding to second written portion 722 is present in local memory 106, this control data may be lost in the case of a UGSD.

During recovery from a UGSD, control data 614 is read to identify the last recorded entries for all open blocks. This identifies boundary 724 of first written portion 720. Scanning of open block 602 proceeds from boundary 724 to identify data stored in second written portion 722 (e.g. to identify LBAs for each written location in second written portion 722). Scanning continues until boundary 726 between second written portion 722 and unwritten portion 728. Such scanning is performed for open blocks 604, 606, and any other open blocks, which may contain different amounts of data to scan. Different copies of the same data (same LBA) may be present in different open blocks and rebuilding control data correctly may require determining which version was most recently written (i.e. some scan results may be discarded as obsolete data).

Such a process of identifying data stored in non-volatile memory to rebuild control data structures may be slow, particularly for non-sequential data, where metadata may be read individually for each unit that was written after the last control data copy (e.g. for each flash management unit, "FMU," written in each open block since the last control data copy). Rebuilding may be faster for sequential data, where units with sequential addresses (e.g. sequential LBAs) are received together and are stored together in non-volatile memory. Where data stored in an open block is identified as sequential, logical-to-physical mapping for all units of such a sequence may be rebuilt together, rather than individually. In many cases, rebuilding of control data includes rebuilding control data for both sequential and non-sequential data so that the time needed may vary depending not only on how much data was written since the last control data copy, but also according to how much of that data was sequential and how much was non-sequential.

Figure 8:
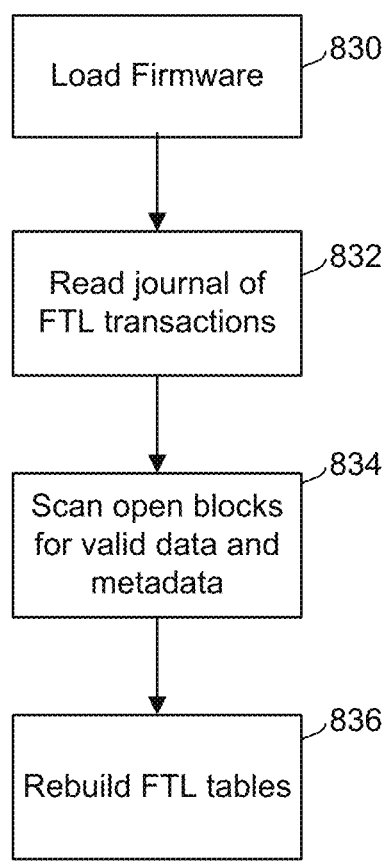
FIG. 8 illustrates an example of steps in recovering from ungraceful shutdown.

FIG. 8 illustrates an example of a process used to rebuild control data, such as control data 610 in local memory 106 after a UGSD. Firmware is loaded 830 (e.g. firmware for operation of controller 102 may be loaded from non-volatile memory 104 to enable operation of controller 102). A journal of FTL (flash translation layer) transactions is then read 832. For example, control data 614 in non-volatile memory 104 may include such a journal. Transactions may include entries relating to logical-to-physical mapping of data, including data written in open blocks prior to the last control data copy operation. Where a graceful shutdown has occurred, this journal may be complete and up-to-date, and this may be indicated by a flag that is set during a graceful shutdown. Where a UGSD has occurred (e.g. as indicated by a flag not being set) the journal may not be complete and up-to-date. Open blocks are scanned 834 for valid data and metadata (e.g. scanning of second written portion 722 of open block 602 for valid data and for LBAs associated with such valid data). From the results of this scanning (applied to all open blocks) FTL tables are rebuilt 836 (e.g. FTL tables are rebuilt in control data 610 in local memory 106). Prior to rebuilding FTL tables, a memory system does not have sufficient information to locate host data and to execute host read commands. Thus, a host cannot access data in such a memory system until control data is rebuilt and therefore may not be able to load data for host recovery operations (e.g. a host booting from a memory system may not be able to access boot data until the memory system completes rebuilding any lost control data). A ready indicator may be provided to a host after FTL tables are rebuilt 836, e.g. a ready signal sent from memory system 100 to host 120 to indicate that memory system 100 is in a ready state in which it can accept read commands. Completing the steps illustrated in FIG. 8 more rapidly may allow read commands to be accepted sooner, which may allow a host to recover more rapidly after a power loss.

In general, scanning and rebuilding control data is faster for sequential data than for non-sequential data. The time needed for either of these operations may be reasonably predictable. Thus, for example, scanning and rebuilding control data for 32 MB of random (non-sequential) host data may take 10 ms while scanning and rebuilding control data for 1 GB of sequential host data may also take 10 ms. In many cases, data to be scanned contains both sequential and non-sequential data and the amount of data to be scanned may vary depending on how much data has been written since the last control data copy operation. While performing control data copy operations more frequently reduces the amount of data to be scanned, this also increases the number of writes to non-volatile memory, which may affect memory endurance.

According to examples of the present technology, a memory system may ensure that its recovery time after a UGSD does not exceed a limit, which may be set by a host. For example, a memory system may use an estimate of recovery time (which may be based on some model, or may be obtained by measuring actual time, or estimated in some other manner) to identify a relationship between control data copy frequency and recovery time, and to set control copy frequency to ensure that recovery time is less than a limit (e.g. to ensure that rebuilding the maximum amount of control data does not exceed a predetermined time).

Figure 9:
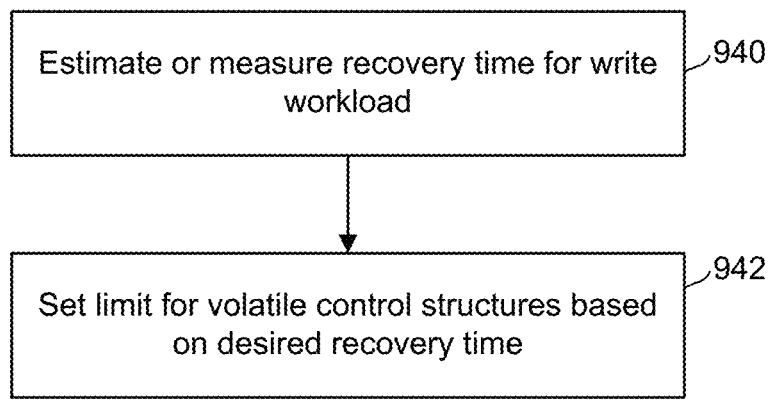
FIG. 9 illustrates an example of a method of configuring a memory system to have recovery time less than a limit.

FIG. 9 illustrates an example of a method that may be applied to a memory system such as memory system 100 to ensure that recovery time does not exceed a limit. A memory system estimates, or measures, recovery time for write workload 940. For example, a memory system may do this by monitoring host write command workload, e.g. monitoring host write commands received by the memory system to determine the amount of sequential data and non-sequential data being received, and from this, may estimate the time needed to rebuild corresponding control data. The memory system may then set a limit for volatile control structures (e.g. control data 610) based on a desired recovery time 942 (e.g. a recovery time set in firmware, set by a host, application, or otherwise). For example, where recovery of control data corresponding to 4 GB of non-sequential host data would take approximately 1.2 seconds, recovery of control data corresponding to 70 MB of host data takes about 20 ms. Thus, assuming that the other operations required for memory system boot (e.g. loading firmware) take approximately 30 ms, copying control data every time 70 MB of host data is written would cap UGSD recovery time at 50 ms even in worst case conditions where all of the 70 MB of host data is non-sequential. Monitoring write commands to identify sequential and non-sequential writes provides a more accurate estimate of recovery time and may allow a lower control data copy frequency (longer interval between control data copy operations, which produces less wear on non-volatile memory cells).

In some non-volatile memories, data received from a host to be written in non-volatile memory is identified as sequential or non-sequential (random) and is stored accordingly, e.g. in different blocks. Data may be classified as non-sequential where fewer than a threshold number of sequential FMUs are written and may be classified when more than the threshold number of sequential FMUs are written. Thus, there may be one or more open sequential blocks for storage of sequential data and one or more open non-sequential blocks for storage of non-sequential data. Such separate storage can facilitate estimating recovery time although it is not necessary.

Figure 10:
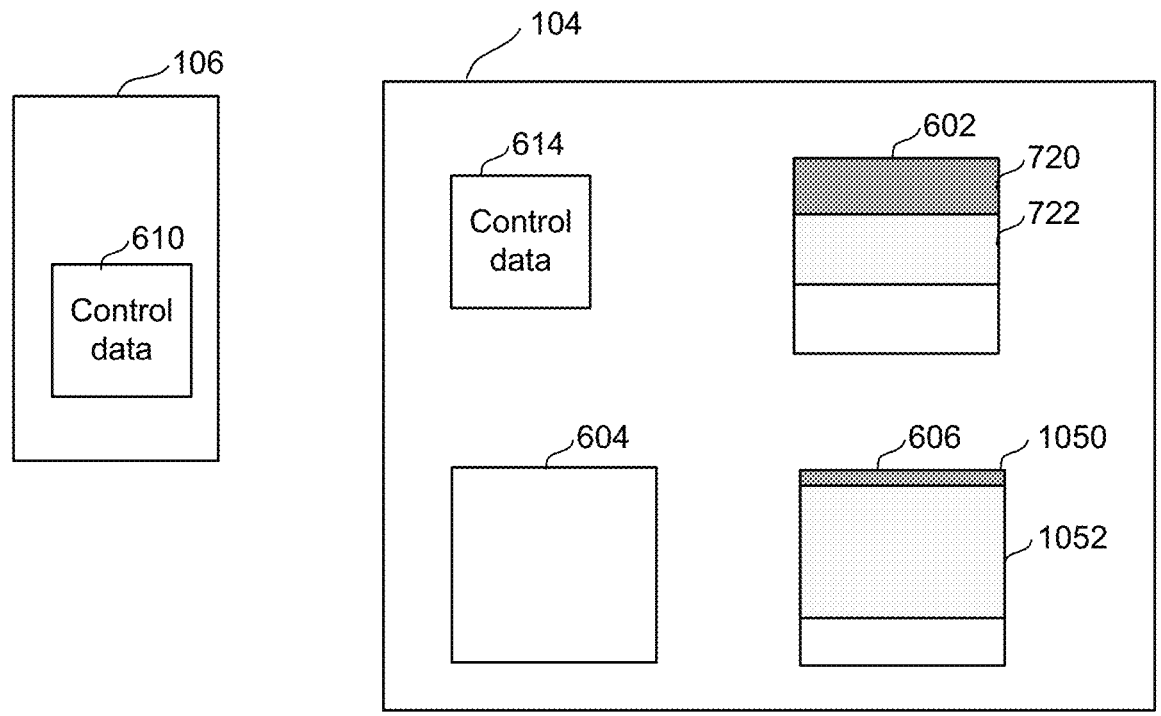
FIG. 10 illustrates an example of a non-volatile memory with sequential and non-sequential open blocks.

FIG. 10 shows an example of non-volatile memory 104 at a time between control copy operations. In this example, open block 602 is an open non-sequential block that stores only non-sequential data while open block 606 is an open sequential block that stores only sequential data. Open block 602 includes first written portion 720 (containing non-sequential data for which corresponding control data is saved in control data 614) and second written portion 722 (containing non-sequential data for which corresponding control data is in control data 610 in local memory 106 but is not saved in control data 614 in non-volatile memory 104). Open block 606 includes first written portion 1050 (containing sequential data for which corresponding control data is saved in control data 614) and second written portion 1052 (containing sequential data for which corresponding control data is in control data 610 in local memory 106 but is not saved in control data 614 in non-volatile memory 104). An estimate of recovery time may include an estimate to rebuild control data corresponding to non-sequential data in second written portion 722 and corresponding to sequential data in second written portion 1052. Generally, rebuilding control data for a given amount of non-sequential data takes longer than for the same amount of sequential data so that, even though there may be more sequential data in second written portion 1052 than non-sequential data in second written portion 722, rebuilding corresponding control data may be faster for sequential data in second written portion 1052 than for non-sequential data in second written portion 722. Weightings may be applied to generate an estimate that reflects these differences in rebuilding control data for sequential and non-sequential data. For example, where rebuilding control data corresponding to non-sequential data takes ten times (10×) longer than rebuilding control data corresponding to sequential data, respective weightings may reflect this ratio (i.e. 10:1). These weightings may be applied dynamically to write data as it is received from a host and stored in non-volatile memory, or may be applied based on some estimate of the composition of write data from a host, or according to some prediction based on modeling, or otherwise.

Figure 11:
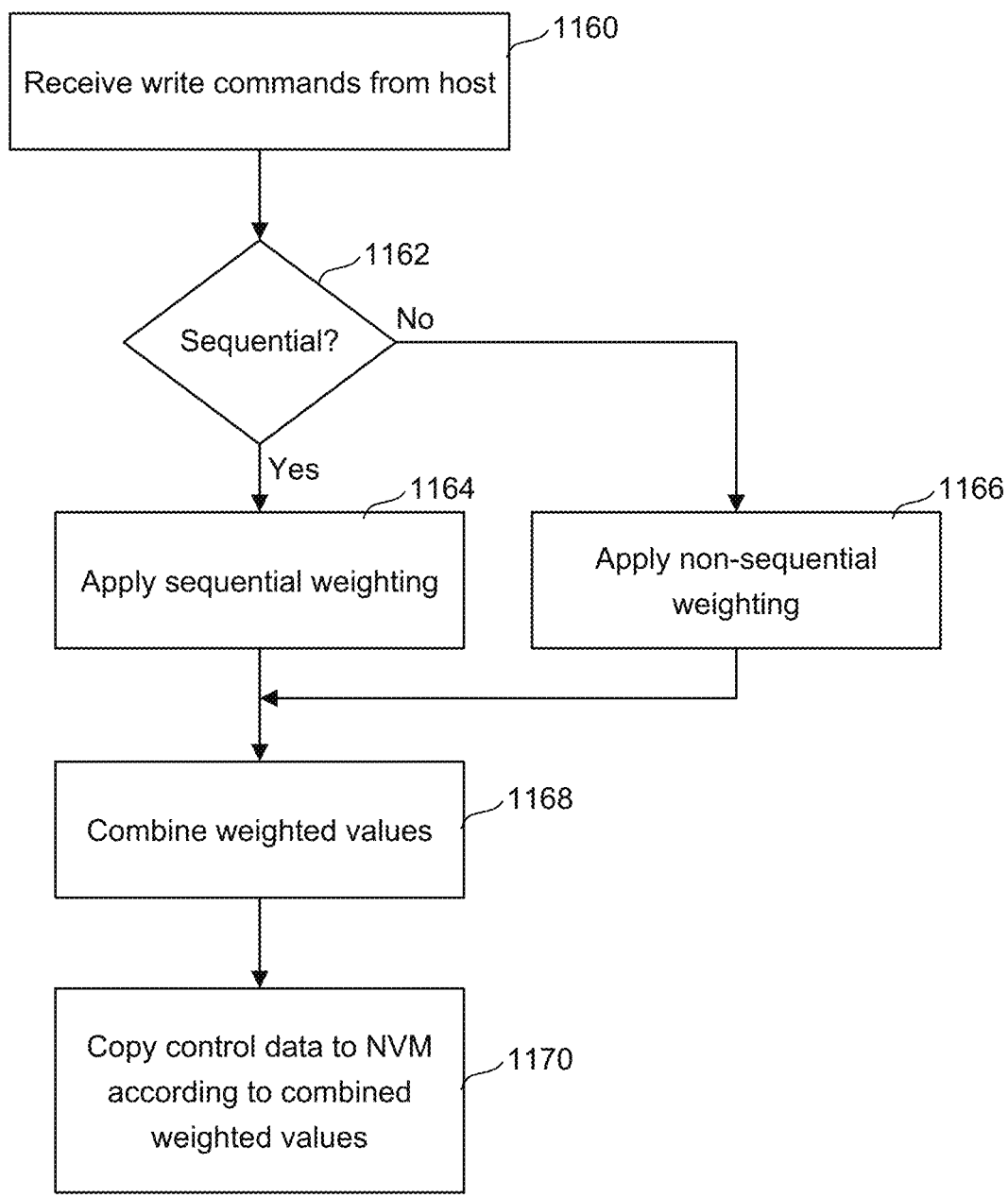
FIG. 11 illustrates an example of a method of copying control data in a memory system.

FIG. 11 illustrates a method for managing control data copy operations in a memory system such as memory system 100. Write commands are received from a host 1160 (e.g. from host 120) and are monitored to determine if write data is sequential 1162. For sequential data, a sequential weighting is applied 1164 (e.g. by multiplying the number of units of sequential data written in non-volatile memory by a first weighting factor reflecting the time per unit to recover control data). For non-sequential data, a non-sequential weighting is applied 1166 (e.g. by multiplying the number of units of non-sequential data written in non-volatile memory by a second weighting factor reflecting the time per unit to recover control data). The weighted values (e.g. weighted amounts of data) are combined 1168 to generate a value that corresponds to the time needed to rebuild corresponding control data for both sequential and non-sequential data. Control data is then copied to non-volatile memory (NVM, e.g. non-volatile memory 104) according to the combined weighted values 1170. For example, control data may be copied at a frequency that is selected so that the longest rebuild time for control data of the sequential and non-sequential data stored since the last control data copy is less than a predetermined maximum time. The copy frequency may be dynamically adjusted in real time so that copying of control data occurs as the amount of sequential and non-sequential data approaches a limit, or may be applied based on some earlier sampling of write commands to estimate control data rebuild time, or may be based on some other characterization of write command workload (e.g. offline modeling).

In some cases, temporary data may be stored by a host in a non-volatile memory such as non-volatile memory 104. Such temporary data may not be needed by the host (e.g. host 120) after UGSD and so rebuilding corresponding control data may not be necessary. Examples of such temporary data may include page or file swap data, cache files (e.g. cache files used by browsers in a host), application-created temporary files, and other temporary data that is not read by a host after a UGSD. Page or swap file data may be data temporarily stored by a host in non-volatile memory while space is unavailable in a host's main memory. After UGSD a host does not read such data from non-volatile memory. Browser cache files may be generated by a browser to speed up loading of some pages. After UGSD, a browser may download such files from the original source rather than from non-volatile memory (where such files may be obsolete). Applications other than browsers may also create temporary files that are not read from non-volatile memory after UGSD (e.g. files related to a user interface). When scanning and rebuilding control data after a UGSD, such temporary data which is not expected to be read may be omitted, which may save significant time. For example, temporary data may not be scanned, and no control data may be rebuilt for such temporary data. In some cases, temporary data may be identified by a host when it sends host write data to a non-volatile memory. An explicit indicator may be provided by a host (e.g. an NVMe context attribute) or may be inferred by a memory system. Temporary data may be stored in one or more dedicated blocks. Thus, there may be one or more open blocks that are dedicated to storage of temporary data at any given time. During a recovery operation from UGSD, such open blocks may be omitted when scanning and rebuilding control data.

Figure 12:
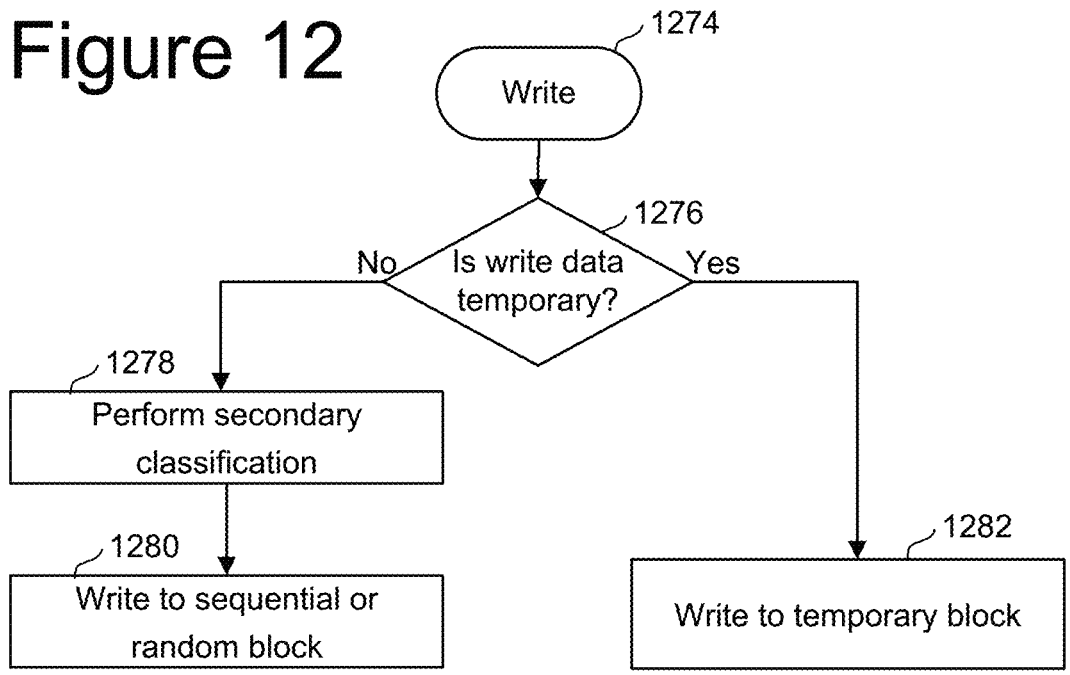
FIG. 12 illustrates an example of a method of writing temporary and non-temporary data in a memory system.

FIG. 12 illustrates an example of a method of operating a memory system such as memory system 100 that separates temporary data and non-temporary data. When write data is received 1274, a determination is made as to whether the write data is temporary 1276. If the write data is not temporary, secondary classification is performed 1278. For example, data may be classified as sequential or non-sequential. Data may also be classified according to frequency of access as frequently accessed "hot" data or infrequently accessed "cold" data and/or may be classified in one or more other manner. Data is then written to sequential and non-sequential (random) blocks accordingly 1280 (e.g. as illustrated in FIG. 10). If write data is temporary, then it is written to a temporary block or blocks 1282, which may be dedicated blocks that are exclusively used for temporary data. In some cases, all temporary data may be written to a single open temporary block, while in other cases, temporary data may be written to two or more open temporary blocks. For example, secondary classification (e.g. into sequential and non-sequential temporary data) may be performed for temporary data and temporary data may written to different open blocks accordingly.

Figure 13:
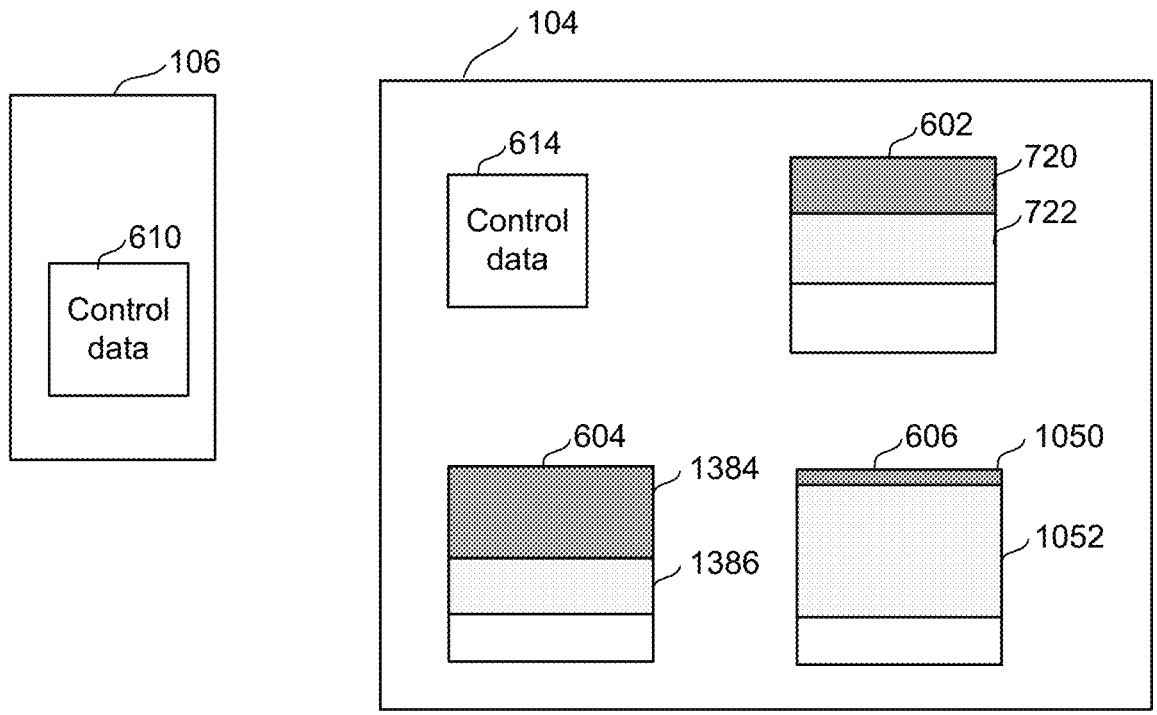
FIG. 13 illustrates examples of a non-volatile memory that includes an open block for temporary data.

FIG. 13 shows an example of non-volatile memory 104 at a time between control copy operations. In this example, open block 602 is an open non-sequential block while open block 606 is an open sequential block as previously illustrated in FIG. 10. In addition, open block 604 is an open temporary block that is dedicated to storage of temporary data. Open block 604 contains a first written portion 1384 (for which control data is stored in control data 614 in non-volatile memory 104) and a second written portion 1386 (for which control data is stored in local memory 106 but not in non-volatile memory 104). After a UGSD, control data rebuild circuits may scan open blocks 602, 606 to identify data stored in second written portions 772 and 1052 respectively. Open block 604 may be omitted from such scanning because second written portion 1386 of open block 604 contains only temporary data that will not be read by a host. Omitting scanning open block 604 and rebuilding corresponding control data may save significant time during recovery from UGSD.

Figure 14:
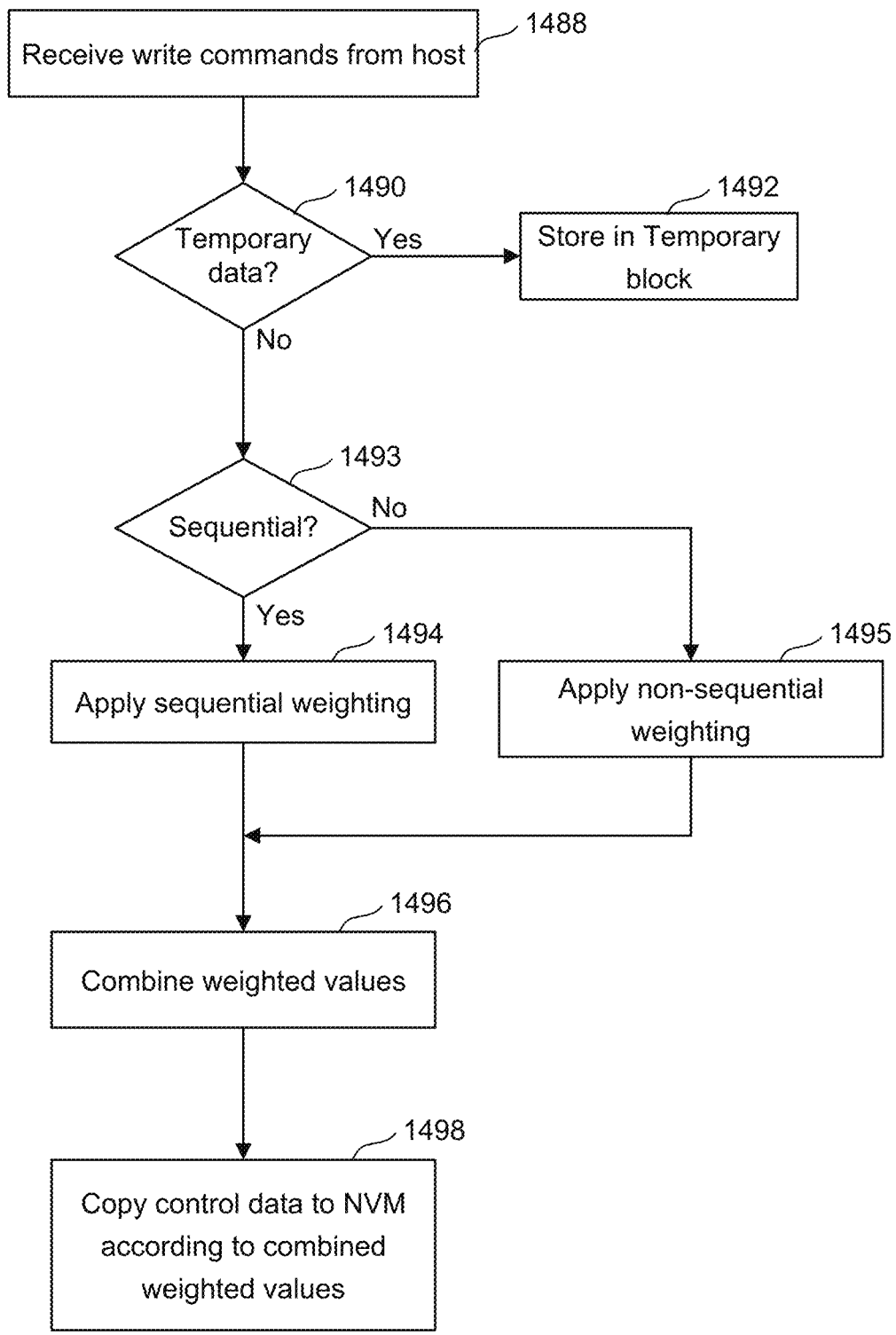
FIG. 14 illustrates an example of a method of copying control data in a memory system.

FIG. 14 illustrates a method of operating a memory system such as memory system 100 that may provide rapid recovery from UGSD. Write commands are received from a host 1488 and a determination is made as to whether write data associated with the write commands is temporary data 1490 (e.g. checking for host indicators, such as NVMe context attributes, which may be received with host write commands). The determination may be made by mapping circuit 608 (which may be considered a means for identifying temporary data received with a host write command and for storing the temporary data in a dedicated block of the plurality of non-volatile memory cells that is dedicated to storage of temporary data). When the data is determined to be temporary data, it is stored in a temporary block 1492, e.g. stored in a block that is dedicated to storage of temporary data according to mapping scheme of mapping circuit 608. If the data is non-temporary data then a determination is made as to whether the data is sequential 1493. For sequential data, sequential weighting is applied 1494 and for non-sequential data, non-sequential weighting is applied 1495, and the weighted values are combined 1496. Control data is then copied to non-volatile memory according to the combined weighted values 1498 (e.g. copied with a control data copy frequency that ensures that rebuilding uncopied control data for non-temporary data will take less than a predetermined time). Note that the combined weighted values do not include any value reflecting temporary data because temporary data is separately stored and is not factored into the weighted values. Because temporary data is not scanned, and because corresponding control data is not rebuilt, temporary data can be omitted when estimating rebuild time and setting control data copy frequency.

Figure 15:
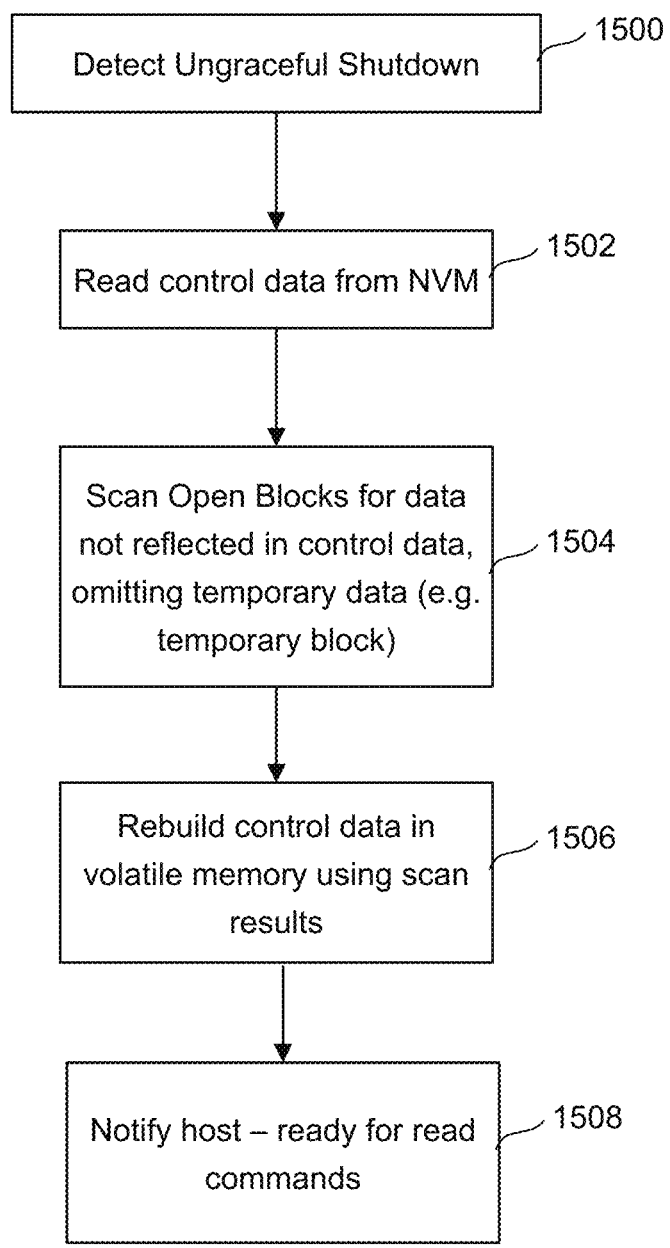
FIG. 15 illustrates an example of a method of recovering from ungraceful shutdown in a memory system that separates temporary data.

FIG. 15 illustrates an example of a method of recovering from a UGSD that may be used in a memory system such as non-volatile memory system 100. The method of FIG. 15 may be used in a memory system that separately stores temporary data (e.g. as illustrated in FIG. 14). An ungraceful shutdown is detected 1500 (e.g. by checking for a flag when power is first received). Control data is read from non-volatile memory 1502 and open blocks are scanned for data that is not reflected in the control data from non-volatile memory, while omitting temporary data 1504 (e.g. data in an open temporary block). Control data is rebuilt in volatile memory (e.g. local memory 106) using the scan results 1506. Scanning and rebuilding may be performed by control data rebuild circuits such as control data rebuild circuits 616 (which may be considered a means for recovering from an ungraceful shutdown by scanning open blocks of the plurality of non-volatile memory cells omitting temporary data stored in the open blocks to rebuild corresponding control data for the plurality of non-volatile memory cells omitting control data associated with the temporary data). Then, the memory system notifies the host that it is ready for read commands 1508. Because the temporary block is not scanned, and corresponding control data is not rebuilt, these steps may be completed more quickly than if temporary data was not separated in this manner.

In some cases, the time for rebuilding lost control data by scanning open blocks and rebuilding the corresponding control data in volatile memory (i.e. steps 1504 and 1506 of FIG. 15) may be recorded. The recorded time, or times, may be compared with a time limit for rebuilding (e.g. a time set by a host). The frequency of copying the control data from the volatile memory to the non-volatile memory may be adjusted according to the difference between recorded rebuilding time and the time limit. For example, if the rebuilding time is significantly less than the limit then the frequency may be reduced. If the rebuilding time is close to the limit, or exceeds the limit, then the frequency may be increased to ensure faster rebuilding. Thus, the memory system may adjust dynamically to ensure that copying is not performed unnecessarily while maintaining the time for rebuilding below a limit. For example, control data copy circuit 612 may determine a frequency for copying control data and may copy control data at the frequency (copy circuit 612 may be considered a means for determining a frequency for copying control data from a volatile memory to a plurality of non-volatile memory cells based on amounts of sequential and non-sequential data received from a host and from a time limit for recovery from an ungraceful shutdown).

An example of an apparatus includes a plurality of non-volatile memory cells and control circuitry connected to the plurality of non-volatile memory cells, the control circuitry configured to receive write commands from a host, identify write commands associated with temporary data, and omit control data associated with the temporary data from rebuilt control data in a recovery operation in response to an ungraceful shutdown.

The control circuitry may be configured to identify write commands associated with temporary data according to indicators provided with the write commands from the host. The control circuitry may be configured to store the temporary data in one or more dedicated blocks of the plurality of non-volatile memory cells that are dedicated to storage of the temporary data. The control circuitry may be configured to rebuild control data in a volatile memory by scanning open blocks of the plurality of non-volatile memory cells, omitting the one or more dedicated blocks. The temporary data may include one or more of: page or swap file data, browser cache files, and application-created temporary files. The control circuitry may be further configured to identify sequential data and non-sequential data received with the write commands. The control circuitry may be configured to copy control data from a volatile memory to the plurality of non-volatile memory cells at a frequency determined by amounts of sequential data and non-sequential data received with the write commands and a time limit for the recovery operation. A time limit for the recovery operation may be selected by the host and the control circuitry may be configured to copy control data from a volatile memory to the plurality of non-volatile memory cells at a frequency determined by estimated time to rebuild the control data such that a maximum estimated time to rebuild the control data is less than the time limit.

An example of a method includes monitoring host write commands received by a memory system; recording control data for data received with the host write commands in a volatile memory; determining a frequency for copying the control data from the volatile memory to a non-volatile memory according to the monitoring of the host write commands; and copying the control data from the volatile memory to the non-volatile memory at the frequency.

Monitoring host write commands received by the memory system may include determining an amount of sequential data associated with the host write commands and an amount of non-sequential data associated with the host write commands. Determining the frequency for copying the control data may include applying respective weightings to the amount of sequential data and the amount of non-sequential data according to estimated time to rebuild corresponding control data, combining weighted amounts of sequential and non-sequential data to obtain a relationship between the host write commands and estimated time to rebuild corresponding control data. Determining the frequency for copying the control data may further include selecting the frequency according to the relationship between the host write commands and estimated time to rebuild corresponding control data such that estimated maximum time to rebuild corresponding control data copied at the frequency is less than a predetermined time limit selected by a host. The method may further include: subsequent to copying the control data from the volatile memory to the non-volatile memory, losing power and losing control data recorded in the volatile memory; recovering copied control data from the non-volatile memory; rebuilding lost control data by scanning open blocks; and indicating a ready state to a host after rebuilding lost control data. The lost control data may consist of control data received in an interval between copying operations at the frequency, such that rebuilding the lost control data takes less than a predetermined time limit. The method may include: recording rebuilding time for rebuilding lost control data by scanning open blocks; comparing the rebuilding time with the predetermined time limit; and adjusting the frequency according to a difference between the rebuilding time and the predetermined time limit. Monitoring host write commands may include identifying temporary and non-temporary data received with host write commands, and rebuilding lost control data by scanning open blocks may omit scanning one or more open blocks dedicated to storage of temporary data. Indicating the ready state to the host may occur without scanning the one or more open blocks dedicated to storage of temporary data.

An example of a memory system includes a plurality of non-volatile memory cells and means for recovering from an ungraceful shutdown by scanning open blocks of the plurality of non-volatile memory cells omitting temporary data stored in the open blocks to rebuild corresponding control data for the plurality of non-volatile memory cells omitting control data associated with the temporary data.

The memory system may further include means for identifying temporary data received with a host write command and for storing the temporary data in a dedicated block of the plurality of non-volatile memory cells that is dedicated to storage of temporary data. The memory system may further include means for determining a frequency for copying control data from a volatile memory to the plurality of non-volatile memory cells based on amounts of sequential and non-sequential data received from a host and from a time limit for recovery from an ungraceful shutdown.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
control circuitry connected to a plurality of non-volatile memory cells, the control circuitry configured to receive write commands from a host, identify sequential data and non-sequential data associated with the write commands, and copy control data associated with the sequential and non-sequential data from a volatile memory to the plurality of non-volatile memory cells at a frequency determined by amounts of sequential data and non-sequential data received with the write commands and a time limit for the recovery operation.

2. The apparatus of claim 1 wherein the control circuitry is configured to identify write commands associated with temporary data according to indicators provided with the write commands from the host.

3. The apparatus of claim 2 wherein the control circuitry is configured to store the temporary data in one or more dedicated blocks of the plurality of non-volatile memory cells that are dedicated to storage of the temporary data.

4. The apparatus of claim 3 wherein the control circuitry is configured to rebuild control data in a volatile memory by scanning open blocks of the plurality of non-volatile memory cells, omitting the one or more dedicated blocks.

5. The apparatus of claim 2 wherein the temporary data includes one or more of: page or swap file data, browser cache files, and application-created temporary files.

6. The apparatus of claim 1 wherein the control circuitry is further configured to identify write commands associated with temporary data, store the temporary data in the plurality of non-volatile memory cells, and omit control data associated with the temporary data stored in the plurality of non-volatile memory cells from rebuilt control data in a recovery operation in response to an ungraceful shutdown.

7. The apparatus of claim 6 wherein the control circuitry is configured to apply respective weightings to the amount of sequential data and the amount of non-sequential data according to estimated time to rebuild corresponding control data and combine weighted amounts of sequential and non-sequential data to obtain a relationship between the host write commands and estimated time to rebuild corresponding control data.

8. The apparatus of claim 1 wherein a time limit for the recovery operation is selected by the host and the control circuitry is configured to copy control data from a volatile memory to the plurality of non-volatile memory cells at a frequency determined by estimated time to rebuild the control data such that a maximum estimated time to rebuild the control data is less than the time limit.

9. A method, comprising:
monitoring host write commands received by a memory system;
recording control data for sequential and non-sequential data received with the host write commands in a volatile memory;
determining a frequency for copying the control data associated with the sequential and non-sequential data from the volatile memory to a non-volatile memory according to the monitoring of the host write commands; and
copying the control data from the volatile memory to the non-volatile memory at the frequency.

10. The method of claim 9 wherein monitoring host write commands received by the memory system includes determining an amount of sequential data associated with the host write commands and an amount of non-sequential data associated with the host write commands.

11. The method of claim 10 wherein determining the frequency for copying the control data includes applying respective weightings to the amount of sequential data and the amount of non-sequential data according to estimated time to rebuild corresponding control data, combining weighted amounts of sequential and non-sequential data to obtain a relationship between the host write commands and estimated time to rebuild corresponding control data.

12. The method of claim 11 wherein determining the frequency for copying the control data further includes selecting the frequency according to the relationship between the host write commands and estimated time to rebuild corresponding control data such that estimated maximum time to rebuild corresponding control data copied at the frequency is less than a predetermined time limit selected by a host.

13. The method of claim 9 further comprising:
subsequent to copying the control data from the volatile memory to the non-volatile memory, losing power and losing control data recorded in the volatile memory;
recovering copied control data from the non-volatile memory;

rebuilding lost control data by scanning open blocks; and indicating a ready state to a host after rebuilding lost control data.

14. The method of claim 13 wherein the lost control data consists of control data received in an interval between copying operations at the frequency, such that rebuilding the lost control data takes less than a predetermined time limit.

15. The method of claim 14 further comprising:

recording rebuilding time for rebuilding lost control data by scanning open blocks;

comparing the rebuilding time with the predetermined time limit; and adjusting the frequency according to a difference between the rebuilding time and the predetermined time limit.

16. The method of claim 13 wherein monitoring host write commands includes identifying temporary and non-temporary data received with host write commands, and wherein rebuilding lost control data by scanning open blocks omits scanning one or more open blocks dedicated to storage of temporary data.

17. The method of claim 16 wherein indicating the ready state to the host occurs without scanning the one or more open blocks dedicated to storage of temporary data.

18. A memory system, comprising:

means for recovering from an ungraceful shutdown by scanning open blocks of a plurality of non-volatile memory cells omitting temporary data stored in non-volatile memory cells of the open blocks to rebuild corresponding control data for the plurality of non-volatile memory cells omitting control data associated with the temporary data stored in the non-volatile memory cells of the open blocks; and means for determining a frequency for copying control data from a volatile memory to the plurality of non-volatile memory cells based on amounts of sequential and non-sequential data received from a host and from a time limit for recovery from an ungraceful shutdown.

19. The memory system of claim 18 further comprising: means for identifying temporary data received with a host write command and for storing the temporary data in a dedicated block of the plurality of non-volatile memory cells that is dedicated to storage of temporary data.

20. The memory system of claim 18 wherein the frequency for copying the control data depends on an estimated time to rebuild corresponding control data obtained from combining weighted amounts of sequential and non-sequential data.

* * * * *